Aug. 18, 1964    J. H. A. BEACON    3,144,732
APPARATUS FOR USE IN THE CULTIVATION OF PLANTS
Filed Aug. 1, 1962    3 Sheets-Sheet 2
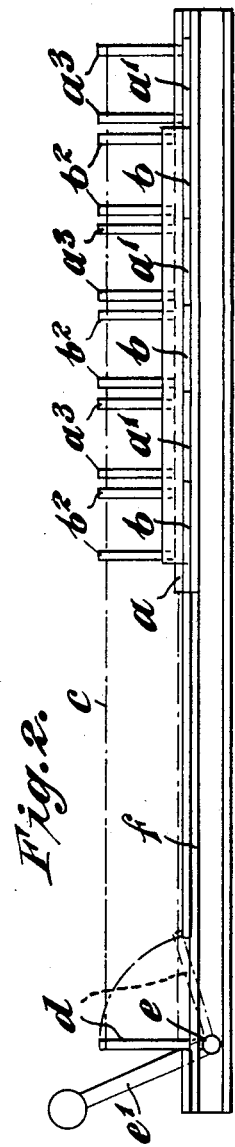
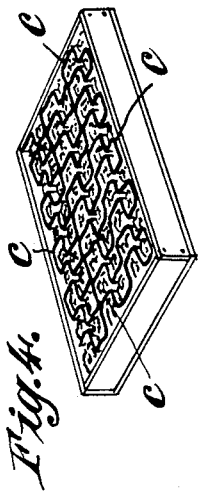

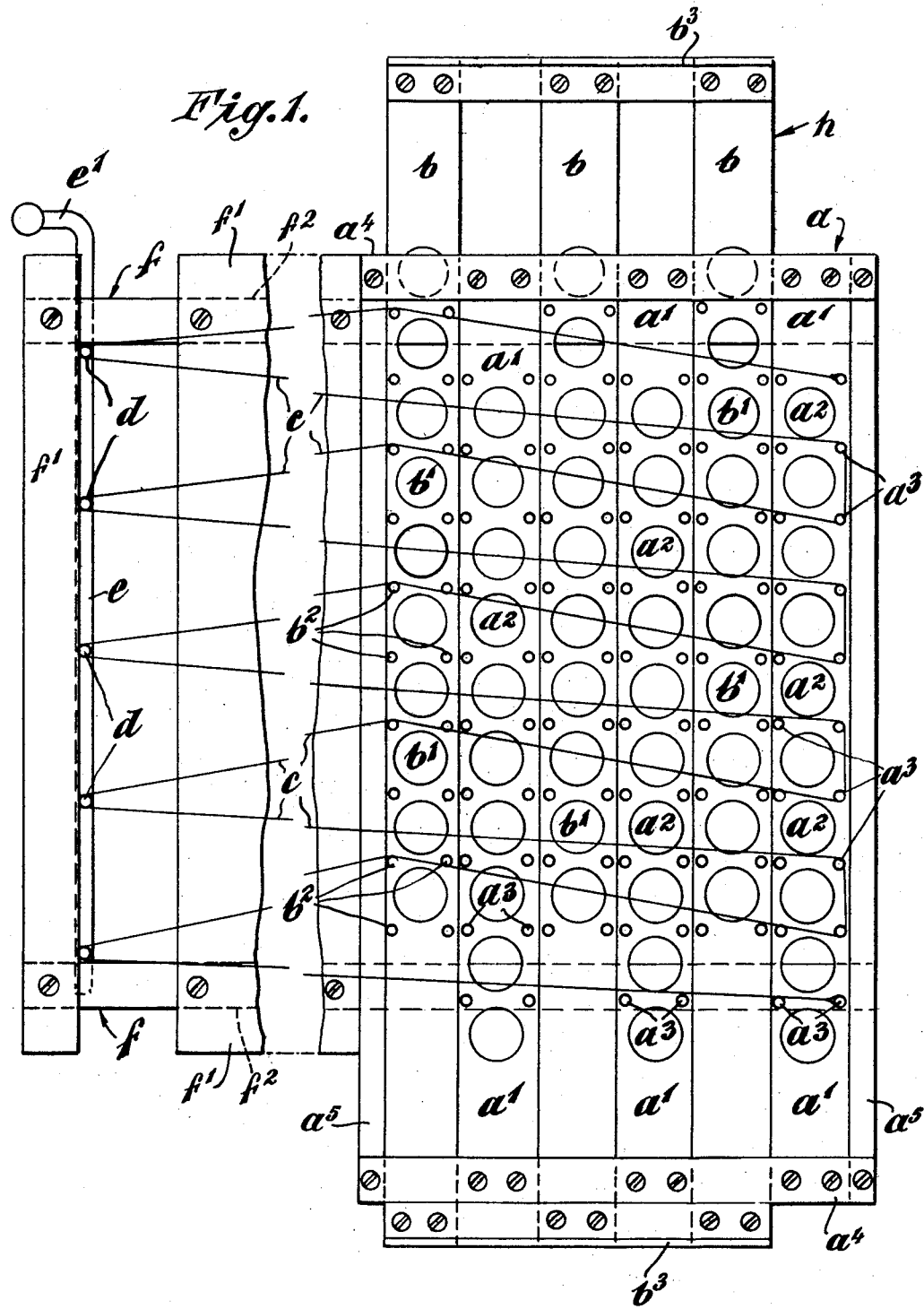

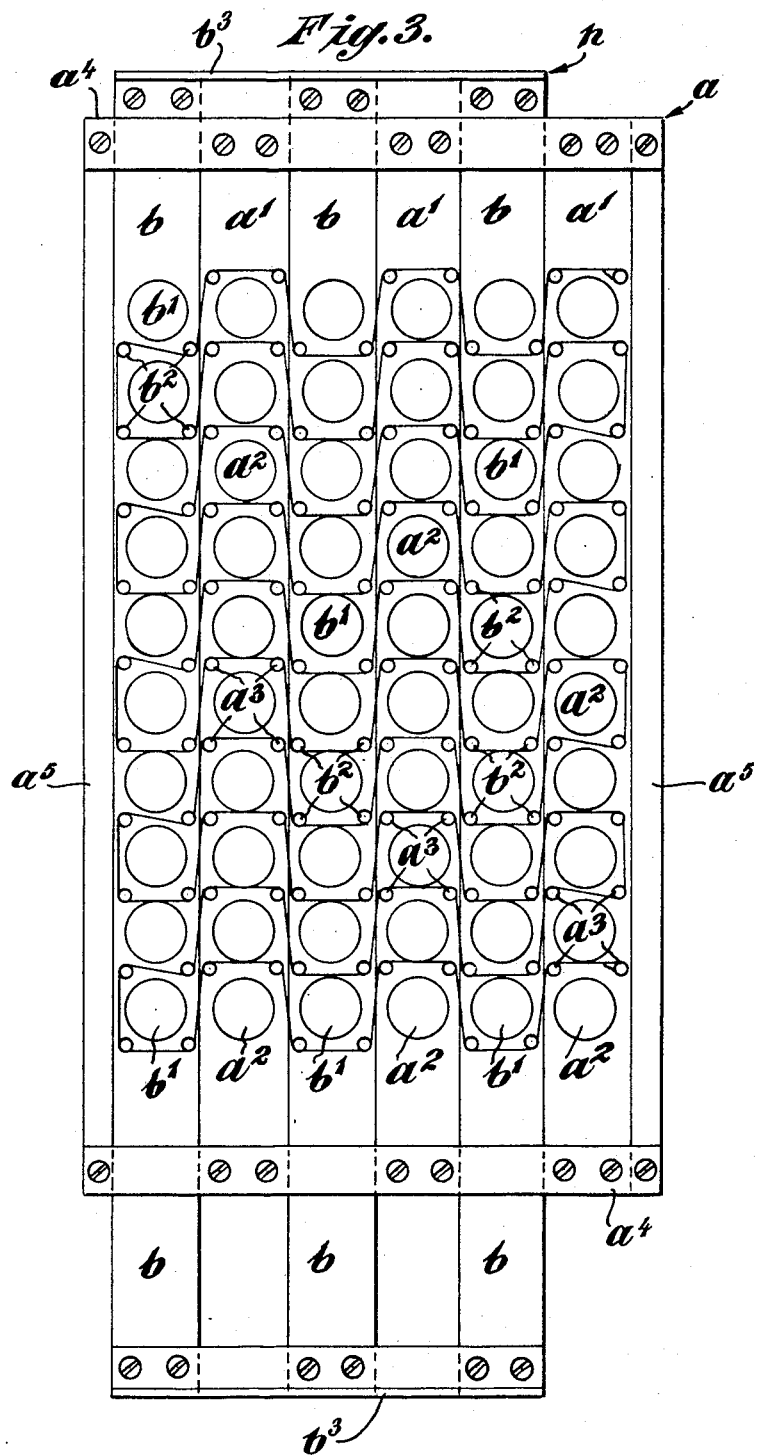

United States Patent Office 3,144,732
Patented Aug. 18, 1964

3,144,732
APPARATUS FOR USE IN THE CULTIVATION OF PLANTS
John Harold Alfred Beacon, Tewkesbury Road, Eckington, near Pershore, England
Filed Aug. 1, 1962, Ser. No. 213,935
1 Claim. (Cl. 47—34.13)

The present invention has relation to apparatus for use in the cultivation of plants and which incorporates a box having a plurality of cells into which there is placed soil, compost, sand or other media capable of supporting plant life, and the invention is more particularly concerned with the means of assembly of such a box or device whereby it can be used a number of times and certain parts replenished when necessary.

According to the present invention there is provided a perforated base carrying upwardly directed pins in alignment, said base incorporating a slide having further pins in such a manner that when the pins having been brought into transverse parallel series a strip of polythene or other flexible plastic or like material may be folded backwards and forwards around the pins in zig-zag manner and the slide operated to bring folds of the strip into undulating formations, the top of one undulation closing the base of another to present rectangular box-like cells. An ordinary seed box is placed over the pins and strip formation and this structure is inverted and compost or the like is fed through the apertures into the cells and the plants to be cultivated are set therein so as to be isolated from their neighbours.

In order that the invention may be clearly understood and readily carried into practice, reference may be had to the appended explanatory sheet of drawings, in which:

FIG. 1 is a plan view of an apparatus according to the present invention.

FIG. 2 is an elevation of FIG. 1.

FIG. 3 is a plan view of part of the apparatus seen in FIG. 1 showing the slide in a position displaced from that shown in FIG. 1, the plastic strip being positioned on the pins ready for the introduction of the box.

FIG. 4 is a small perspective view of a seed box prepared in accordance with the present invention.

In a convenient embodiment of the invention there is provided a base $a$ comprising a plurality of spaced strip members $a^1$ each having a row of circular apertures $a^2$, for example, three strips having ten apertures each. The strip members $a^1$ are held together by means of end strips $a^4$ and side strips $a^5$. Each strip $a^1$ has a row of pins $a^3$ adjacent each edge. In between the strips $a^1$ of the base $a$ complementary strips $b$, having apertures $b^1$ and upwardly directed pins $b^2$, are arranged to slide. The strips $b$ are held together by means of end strips $b^3$ to form a slide $h$. A frame $f$ also is provided and includes two spaced strips $f^1$ connected together by means of end strips $f^2$. The base $a$ and the slide $h$ rest upon the frame $f$ as shown in FIG. 1. In operation, all pins first are brought into the arrangement shown in FIG. 1 by sliding the slide $h$ relative to the base $a$ until there is a transverse row of pins between each transverse row of apertures and then a strip of polythene or like plastic material $c$ is attached to an end pin and passed around the pins $a^3b^2$ on the base $a$ and slide $h$, respectively, backwardly and forwardly, a certain tautness being obtained by the use of other stationary and temporary pins $d$ offset from the base and carried by a rod $e$ pivotally mounted in the frame $f$. The rod has a counterweighted handle $e^1$ to maintain the tautness on the strip $c$. It will be appreciated that the pins $d$ will be rocked automatically to free the strip $c$ by movement of the slide $h$. Alternatively, the rod $e$ could be spring-controlled.

Then by releasing the plastic material $c$ from the temporary pins $d$ and displacement of the slide $h$ from its FIG. 1 position to its FIG. 3 position (pins on the slide staggered in the direction of slide movement relative to the pins on the base), the strip $c$ which is wound backwardly and forwardly is caused to assume an undulating configuration so that the top of one undulation closes the bottom of an adjacent undulation and thereby a cellular or pocketed structure is formed. An ordinary seed box is then placed over the assembly and the base $a$, slide $h$ and box are removed from the frame $f$ and entirely inverted so that there is presented an upper plate with apertures each leading into a cellular compartment. Into these compartments soil or compost is placed. The base plate $a$ and slide $h$ together with the pins are then removed so that the box is now ready for the purpose of growing, raising or propagating plants, parts of plants or seeds, the roots of those in one cell being held more or less in isolation from those in another cell by the material of which the partitions are made.

In the embodiment described and illustrated the arrangement is such as to provide sixty pockets or cells, but it will be appreciated by varying the number of strips in the base and slide and varying the number of apertures and the number of pins $d$, the number and size of pockets or cells in a standard box can be varied to a considerable degree.

I claim:

Apparatus for horticultural use comprising, in combination, a base including a plurality of spaced strip members immovable relative to each other and each defining a row of apertures, a slide including a plurality of spaced strip members immovable relative to each other and each defining a row of apertures, the strips of the slide being juxtaposed to the strips of the base in an alternate arrangement wherein all of the strip members are coplanar, the slide strips being arranged to slide relative to the base strips, pairs of upwardly directed pins, each of said pairs being connected to said strip members between the adjacent apertures of said rows of apertures with the pins of each pair spaced to position them contiguous to the edges of their respective strip member, the slide having a first position wherein the apertures are aligned in rows transverse to the direction of slide movement and there is a transverse row of pins between each transverse row of apertures and a second position reached after a movement equal to twice the distance between the centers of any two adjacent apertures taken in the direction of said movement and wherein the end pins on the slide are staggered in the direction of said movement relative to the end pins on the base and the rest of the pins form a plurality of transverse rows, whereby undulating form is imparted to a single strip of flexible material wound, when the slide is in said first position, in zig-zag formation about and inserted between a plurality of said transverse rows of the pins when the slide is moved from said first position to the second position, portions of the undulations being staggered with respect to the corresponding portions of the undulations of the next successive part of the strip to form box-like cells.

References Cited in the file of this patent

UNITED STATES PATENTS

| 2,606,133 | Havens | Aug. 5, 1952 |
| 2,739,422 | Perkins | Mar. 27, 1956 |
| 2,870,575 | Weber | Jan. 27, 1959 |

FOREIGN PATENTS

| 22,466 | Great Britain | Sept. 28, 1910 |